United States Patent
Tucker et al.

(10) Patent No.: US 11,309,937 B2
(45) Date of Patent: Apr. 19, 2022

(54) ELECTRONIC DECOUPLING IMPEDANCE

(71) Applicant: Schaffner EMV AG, Luterbach (CH)

(72) Inventors: Andrew Cecil Tucker, Victoria (AU); Tianyi Zhang, Olten (CH); Roland Gentsch, Hauterive (CH)

(73) Assignee: Schaffner EMV AG, Luterbach (CH)

( * ) Notice: Subject to any disclaimer, the term of this patent is extended or adjusted under 35 U.S.C. 154(b) by 0 days.

(21) Appl. No.: 17/292,465

(22) PCT Filed: Nov. 7, 2019

(86) PCT No.: PCT/IB2019/059581
§ 371 (c)(1),
(2) Date: May 10, 2021

(87) PCT Pub. No.: WO2020/115585
PCT Pub. Date: Jun. 11, 2020

(65) Prior Publication Data
US 2022/0021414 A1    Jan. 20, 2022

(30) Foreign Application Priority Data
Dec. 3, 2018   (EP) ..................... 18209935

(51) Int. Cl.
*H04B 3/56*  (2006.01)
*H01F 38/14*  (2006.01)

(52) U.S. Cl.
CPC ............. *H04B 3/56* (2013.01); *H01F 38/14* (2013.01); *H01F 2038/143* (2013.01); *H04B 2203/5491* (2013.01)

(58) Field of Classification Search
CPC . Y02B 20/40; H04B 3/54; H04B 3/56; H04B 2203/5491; H01F 38/14; H01F 2038/143
See application file for complete search history.

(56) References Cited

U.S. PATENT DOCUMENTS

2017/0179931 A1*  6/2017  Tucker ................... H02M 1/44
2018/0123344 A1*  5/2018  Tucker ............... H03H 11/0405

FOREIGN PATENT DOCUMENTS

EP        2501052 A1     9/2012

OTHER PUBLICATIONS

International Search Report & Written Opinion for PCT/IB2019/059581 dated Dec. 6, 2019, 8 pgs.

* cited by examiner

*Primary Examiner* — Sung S Ahn
(74) *Attorney, Agent, or Firm* — Blank Rome LLP

(57) ABSTRACT

An active decoupling device for stabilizing the impedance on an electric line in a determined band of frequency. The decoupling device of the invention is inductively coupled to the power line and comprises a transformer with a primary winding connectable to the power line, and a secondary winding closed on a burden network. In an application, the invention, is used to decouple a smart meter from variations of the load impedance.

7 Claims, 6 Drawing Sheets

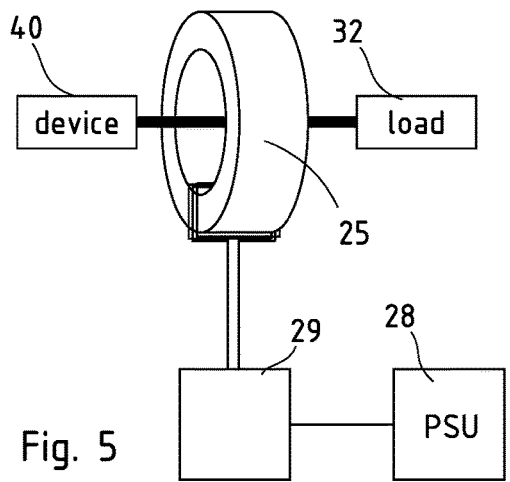
Fig. 5
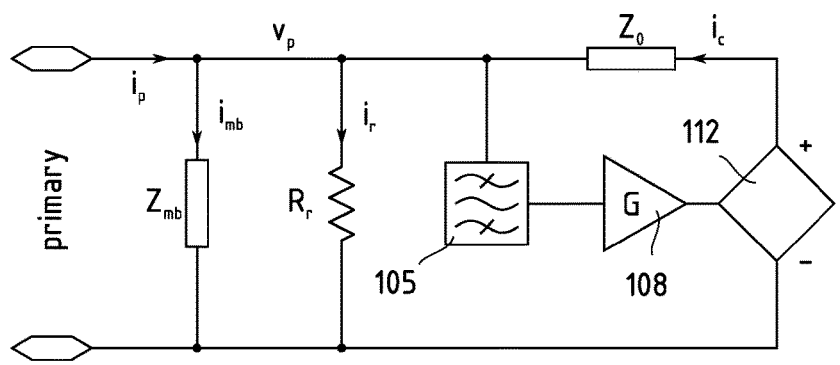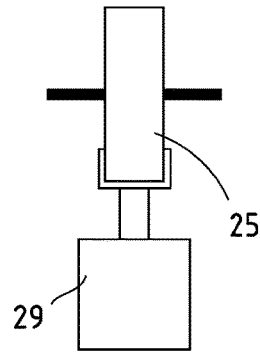
Fig. 6a
Fig. 6b
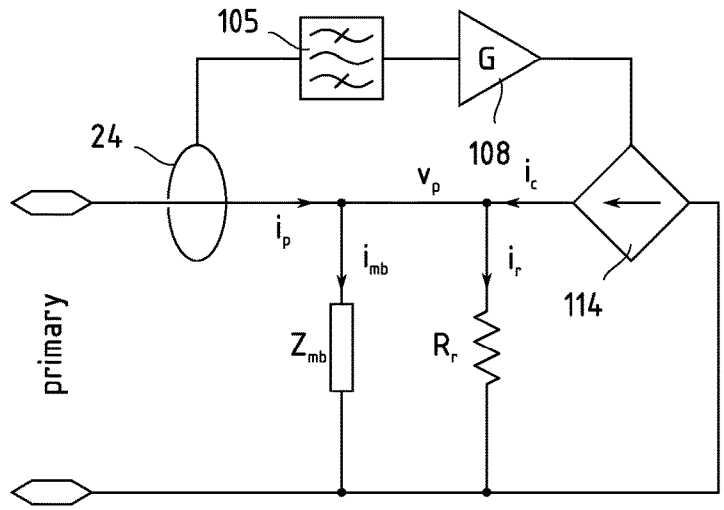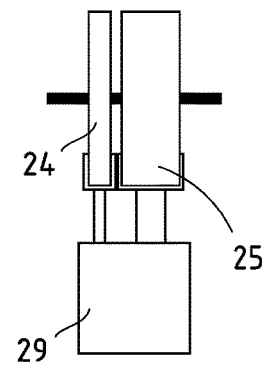
Fig. 7a
Fig. 7b

ELECTRONIC DECOUPLING IMPEDANCE

RELATED APPLICATIONS

The present application is a national phase of PCT/IB2019/059581, filed Nov. 7, 2019, which claims the benefit of European Patent Application 18209935.8, filed Dec. 3, 2018. The entire disclosures of which are hereby incorporated by reference.

FIELD OF THE INVENTION

The invention relates to electronic active impedances that can be used to decouple a device (designated in the following as the "victim device") on an electric line, from the impedance that may occur on the line itself, either on the network side or on the load side. The invention is applicable to several devices that cannot tolerate too low impedances on the network in a determined frequency range, for example active filters. A special case of application is that of "smart" electricity meter devices that record consumption of electric energy and communicate the information to the electricity supplier through a powerline modem.

DESCRIPTION OF RELATED ART

Automatic reading of energy metering is known in the art and rely on several data transmission technologies. In electric meters, powerline communication signals are typically injected between phase and neutral, i.e. in differential mode. The amplitude of the signals may be of about 10V peak or less with typical frequency range 35 kHz to 500 kHz.

Power line communication frequency bands suitable for the present invention are assigned as follows:
  35 kHz to 91 kHz in Europe (part of CENELEC A band)
  98 kHz to 122 kHz in Europe (part of CENELEC B band)
  155 kHz to 403 kHz in Japan (part of the ARIB band)
  155 kHz to 487 kHz in the USA (part of FCC band).

A problem with these devices is that the signals are attenuated by the load impedance existing on the powerline. When load impedance is too low, for example below 1 ohm, the signal is attenuated to critically low levels and communication can fail.

Furthermore, loads on the network generate disturbances and spurious signals in the signalling band of frequencies, which can result in transmission errors.

It is known to introduce a choke network, or another passive attenuation network, downstream to the smart meter, between this and the load, to generate an inductance that limits the signal attenuation at 35 kHz and above, without blocking the power current at 50/60 Hz. The choke must be large enough to avoid saturation, and necessarily introduces power losses.

The above situation is not limited to smart meters but it occurs whenever it is necessary to isolate a device on an electric network from the variation of impedance thereof, in a determined band of frequency, as it may be the case for active EMI filters, for example, in a smaller package and at lower cost than with known passive solutions.

BRIEF SUMMARY OF THE INVENTION

The present invention presents an improved solution for stabilizing the line impedance downstream of a victim device in a predetermined band of frequency. In a use case, the victim device is a PLC modem or a smart meter transmitting in the aforesaid band of frequency. The invention overcomes the limitations of the known art, by an active decoupling impedance having the features of the first independent claim. The present invention proposes an active impedance with a transformer having a primary connectable on the electrical power line, like a current transformer, and whose secondary is loaded by an active burden circuit. The active burden circuit is arranged to present a low impedance at the power frequency, and a higher impedance in the targeted band. An additional advantage is that the transformer and burden are galvanically isolated from the power line.

Thanks to the inventive features, the voltage drop at power frequency is contained, due to the low burden value, such that magnetizing flux is contained and a small core is enough to prevent saturation. At the same time, the burden impedance in the targeted band is higher, such that the impedance seen from the primary side of the transformer is proportionally larger, and the signals are not attenuated. The device of the invention can be dimensioned to introduce an additional impedance in the targeted band, and in this way prevent excessive attenuation, irrespective of the load. This impedance is preferably resistive in nature, and its magnitude may be higher than 5 Ohm, or better 10 Ohm. In practical realization, values of about 50-100 Ohm are attainable.

The dependent claims relate to optional advantageous features including the frequency of the targeted band that, according to the standards mentioned above, may be from 35 kHz to 500 kHz; an advantageous active structure with an amplifier or an unity-gain buffer cancelling a current flowing in the burden network in the targeted band, responsive to the output of an high-pass filter; a burden network including a series of impedances. The burden network and the high-pass filter are dimensioned such that at power frequency the output current of the amplifier is essentially zero while, in the targeted band, the burden network draws no current from the transformer.

BRIEF DESCRIPTION OF THE DRAWINGS

The invention will be better understood with the aid of the description of an embodiment given by way of example and illustrated by the figures, in which:

FIG. 5 shows schematically an embodiment with a ring-type current transformer.

FIGS. 6a and 6b show an open-loop voltage-controlled, voltage source embodiment of the inventive device.

FIGS. 7a and 7b show a closed-loop current-controlled embodiment.

DETAILED DESCRIPTION OF POSSIBLE EMBODIMENTS OF THE INVENTION

Figure 1:
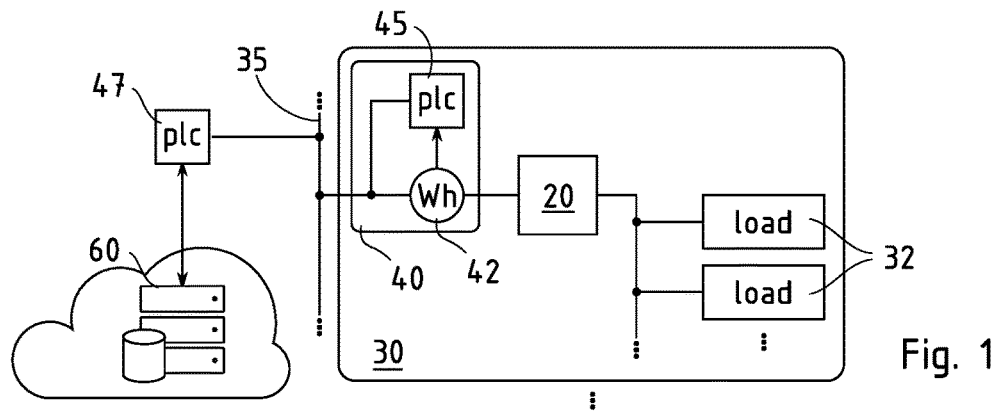
FIG. 1 shows a smart meter installation including the inventive active impedance, in a simplified representation.

FIG. 1 shows a smart meter installation including the inventive decoupling impedance. The area 30 represents an electrical installation of a customer, with several loads connected to a secondary power line 35 that comes from a distribution transformer (not represented) and may serve also other costumers.

A smart meter 40 placed at the entry records the accumulated electrical consumption and transmits it, via the plc modem 45 and the data concentrator 47 to a server 60 of the electricity provider. The consumption information is used for billing and for controlling the network, for example. Bidirectional communication, from the server to the meter, is also possible.

The electronic decoupling impedance 20, placed between the meter 40 and the loads 32, prevents the line impedance from being pulled down by the load impedance, and avoid the attenuation of the communication signal and mitigate the noise emitter from the load mentioned in the introduction.

It is understood that, insofar as the object of the present invention is to decouple a device on an electric network from the variations of impedance on the network, its usefulness is not limited to smart meters, but extends to many situation in which it necessary to protect a device (denoted "victim device") from the variation of the impedance on a network. Hence, the use case shown in FIG. 1 is not exhaustive, and the invention could be used to decouple any victim device 40, irrespective of the presence of a plc communication interface. The victim device can be protected from impedance fluctuations on the load side, as in FIG. 2a, as well as on the network side, as in FIG. 2b.

Figure 3:
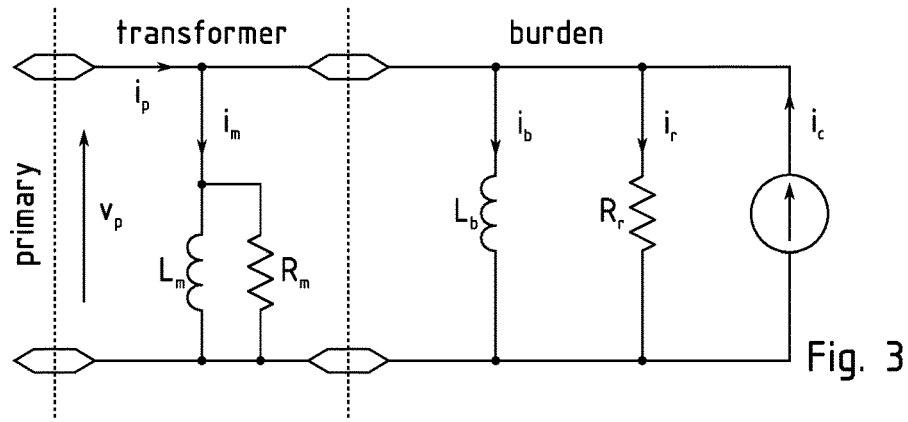
FIG. 3 is an equivalent circuit of the device of the invention including a transformer and a burden load.

FIG. 5 shows how the decoupling device of the invention is inductively coupled to the power line between the victim device 40 and the load 32. The active decoupling impedance of the invention comprises a transformer with a primary winding connectable to the power line, and a secondary winding closed on a burden network 29. Advantageously, the transformer can be a current transformer with a solid-ring core 25 in which the powerline cable or bus can be inserted, such that the number of spires in the primary is $N_p=1$. In this way, the active decoupling impedance of the invention can be installed without cutting the powerline, as shown in FIG. 3. Other possible arrangements include split-core transformers, which can be clamped on the power line without opening it and, on the other hand, transformers with a wound primary.

In the following description we consider a transformer model with all values referred to the primary side. The transformer model would normally include an ideal transformer where the turns-ratio is considered. For simplicity the transformer in this description is assumed to have a 1:1 turns-ratio. In most real use cases, the transformer will have a primary winding of 1 turn and multiple turns on the secondary. The power line sees the impedance of the burden network scaled by the square of the turn ratio: $Z_p=Z_s \cdot (N_p/N_s)^2$; spurious components such as stray inductance, winding resistance and stray capacitance are also ignored in this description. For suitable circuit operation, the impedance of these components, within the operating frequency band, should be kept small compared to other circuit impedance parameters.

The transformer coupling coefficient, k, should be sufficiently close to 1. In this case the stray inductance will be small compared to other inductance values.

Voltage S/N Ratio

Figure 2A:
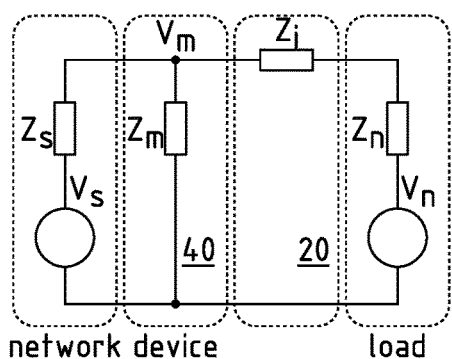
FIGS. 2a and 2b shows a simplified model of the transmission channel for a victim device that needs protection from variations of the load impedance, respectively of the network impedance.

FIG. 2a is a representation of the power line where the victim device is inserted. the victim device may be a smart meter as in FIG. 1, an active EMC filter, or any device that should be decoupled from the variations of impedance of the load. Consider the following voltages and impedances at the point in the network where the victim device is connected
$V_s$ Communication signal voltage
$Z_s$ Communication signal source impedance
$V_m$ Received voltage at the victim device
$Z_m$ victim device input impedance
$Z_i$ decoupling impedance
$V_n$ Noise voltage from load
$Z_n$ Noise source impedance from load The received voltage at the victim device $v_m$ is the sum of communication signal from the network and noise voltage from the load. The voltage signal to noise ratio, denoted as SNR in the following, indicates device input impedance $Z_m$ is assumed to be high compared to the other impedances. In this approximation, the equivalent circuit of FIG. 2a can be solved and the SNR before and after insertion of the stabilizer impedance $Z_i$ is computed as follows:

Without the Invention
Received signal voltage at victim device: $V_{m1}=V_s \cdot Z_n/(Z_s+Z_n)$
Received noise voltage at victim device: $V_{m2}=V_n \cdot Z_n/(Z_s+Z_n)$
SNR: $V_{m1}/V_{m2}=V_s/V_n \cdot Z_n/Z_s$ With the Invention
Signal voltage at victim device: $V_{m3}=V_s \cdot (Z_n+Z_i)/(Z_s+Z_n+Z_i)$
Noise voltage at victim device: $V_{m4}=V_n \cdot Z_s/(Z_s+Z_n)$
SNR: $V_{m3}/V_{m4}=V_s/V_n \cdot (Z_n+Z_i)/Z_s$ The active decoupling impedance of the invention stabilizes the load impedance seen and yields an improvement of the voltage S/N ratio given by $$\frac{SNR_{with}}{SNR_{without}} = \frac{Z_n + Z_i}{Z_n} = \frac{Z_i}{Z_n} + 1$$

Therefore, to improve voltage signal to noise ratio we must have $Z_i \gg Z_n$

Figure 2B:
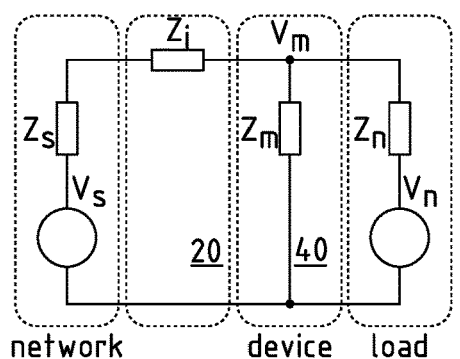

Similar considerations apply to the case in which the decoupling impedance 20 is on the network side, as in FIG. 2b.

Principle of Operation

Figure 4A:
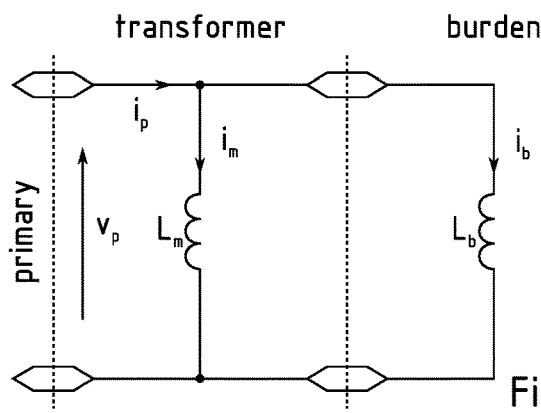
FIGS. 4a and 4b are the resulting equivalent circuits of the line impedance of the invention at power frequency, respectively in the targeted band.

The principle of operation will now be discussed with reference to FIGS. 3, 4a, 4b, of which the first shows an equivalent circuit to the decoupling impedance with
$v_p$ Primary voltage
$i_p$ Primary current
$L_m$ Magnetizing inductance
$i_m$ Core loss resistance
$i_m$ Magnetizing current
$L_b$ Burden inductance
$i_b$ Burden current
$R_r$ Residual resistance
$i_r$ Residual current
$i_c$ Compensation current The primary current is defined by $i_p=i_m+i_b+i_r-i_c$ Power Frequency (FIG. 4a)

Assume $i_c \approx 0$ and $i_r \approx 0$: an impinging current at power frequency gives $i_p=i_m+i_b$. When $L_m \gg L_b$ then $i_p \approx i_b$, therefore the primary voltage will be $v_p=i_p \cdot j\omega L_b$ and the magnetizing current $i_m=v_p/(j\omega L_m)$. Then $i_m \cdot j\omega L_m = i_p \cdot j\omega L_b$.

Therefore, $i_p/i_m=L_m/L_b$ and the transformer core has a saturation current of $i_m$. The addition of the burden allows the phase current to be $i_p=(L_m/L_b) \cdot i_m$.

Note that the above depends from the assumption that the total impedance of the stray inductance and all the winding resistances are significantly less than the impedance $L_b$ at power frequency.

Figure 4B:
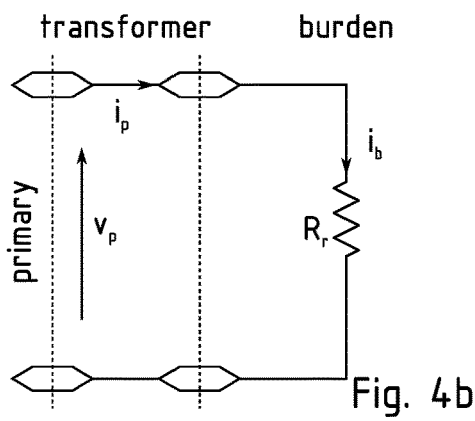

Target Frequency (FIG. 4b)

Make $i_c=i_m+i_b$, then $i_p=i_r$: an impinging signal voltage $v_p$ produces a current $i_r$. The primary impedance is $Z_p=v_p/i_r$. Moreover, $i_r=v_p/R_r$, therefore $Z_p=R_r$.

Preferably, the transformer should have a significantly high coupling coefficient to realize the above expression. A lower coupling coefficient will result in a higher stray inductance which will diminish the effectiveness.

Open Loop Voltage-Controlled Embodiment (FIGS. 6a-6b)

FIGS. 6a and 6b show a possible example of realization of the inventive decoupling impedance with an active burden network configured as an open-loop controller. The burden is connected on the secondary winding of a transformer, as illustrated in FIG. 6b, and FIG. 6a is an equivalent circuit as seen from the primary side. The filter 105 selects the voltage signal in the band of frequencies where the plc communication takes place and, by the amplifier 108 and controlled voltage source 112, generates a compensating voltage. We introduce the following abbreviations:

$v_p$ Primary voltage
$i_p$ Primary current
$Z_{mb}$ Magnetizing and burden equivalent impedance
$i_{mb}$ Magnetizing and burden equivalent current
$R_r$ Residual resistance
$i_r$ Residual current
$i_c$ Compensation current
$A_v$ Loop voltage gain We require $I_c=I_{mb}$ so that $i_p=i_r$. Then $v_p=i_c \cdot Z_{mb}$ and $v_0=i_c \cdot (Z_0+Z_{mb})$. Therefore, the loop voltage gain is $A_v=v_0/v_p=(Z_0+Z_{mb})/Z_{mb}$ and the resultant impedance on the primary is given by $Z_p=v_p/i_r=R_r$.

FIG. 6b shows the active burden 29 in the variant of FIG. 6a, connected directly to the secondary winding of the transformer 25.

Figure 9:
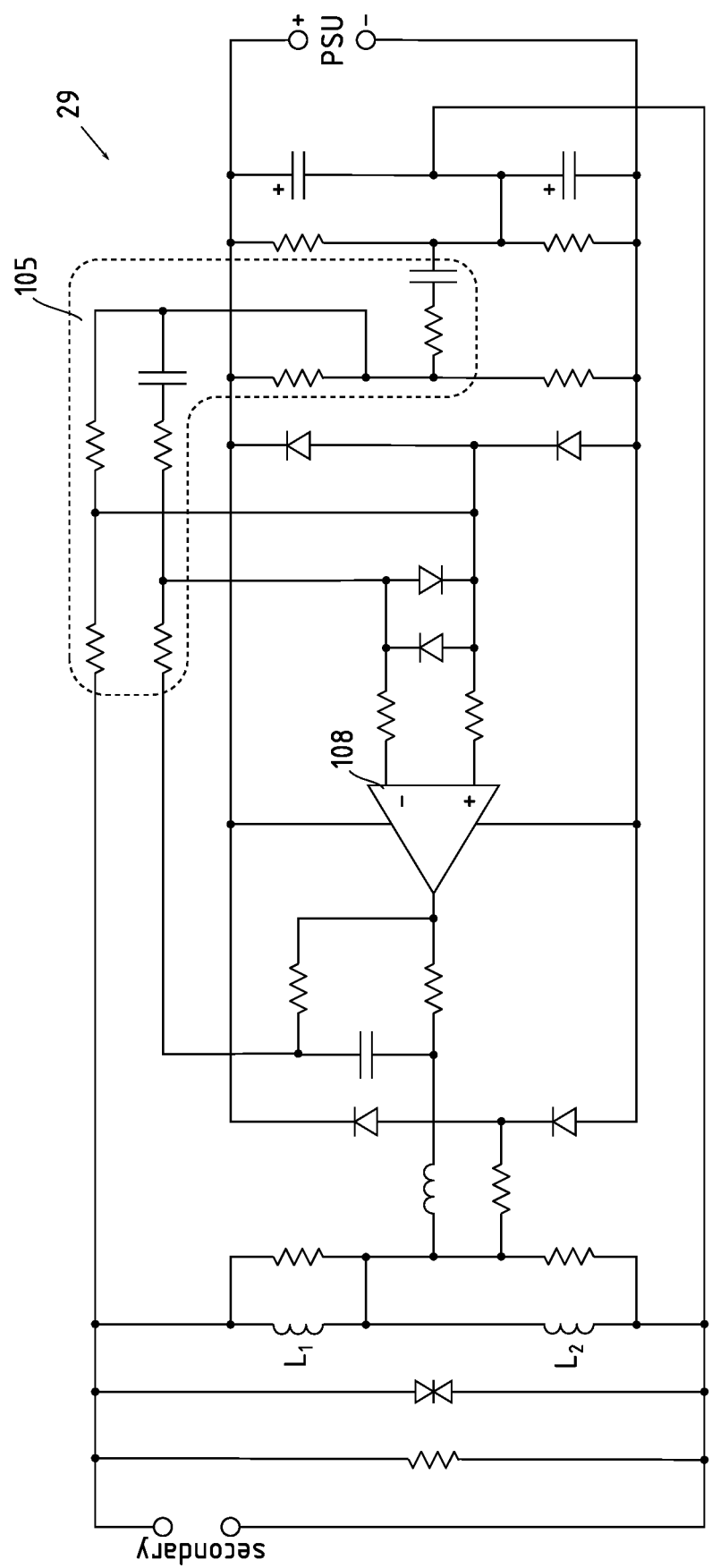
FIG. 9 shows a circuit realization of the active burden for an open-loop voltage-controlled embodiment.

FIG. 9 shows a possible implementation of an active burden circuit 29 that could be used in the embodiment of FIGS. 6a-6b. The amplifier 108 generates a voltage that is injected in the node between the inductances L1 and L2, thereby reducing the current flowing through them, in the target band. Other inductance arrangements are possible where L1 or L2 may be omitted.

Closed-Loop Current Controlled Embodiment (FIGS. 7a-7b)

Another possible example of realization includes, as represented, a controlled current source 114 that is driven by an amplifier 108 whose input is connected to current sensor 24, which may be an auxiliary current transformer. The filter 105 limits the action of the compensation circuit to the target band, such that, at power frequency, the decoupling impedance of the invention is equivalent to the circuit of FIG. 4a. We introduce the following abbreviations:

$v_p$ Primary voltage
$i_p$ Primary current
$Z_{mb}$ Magnetizing and burden equivalent impedance
$i_{mb}$ Magnetizing and burden equivalent current
$R_r$ Residual resistance
$i_r$ Residual current
$i_c$ Compensation current
$A_i$ Loop current gain We require $i_c=i_{mb}$ so that $i_p=i_r$. Then $v_p=i_c \cdot Z_{mb}$ and $i_r=v_p/R_r$. Current loop gain is $A_i=i_c/i_r=R_r/Z_{mb}$, and the resultant primary impedance is given by $Z_p=V_p/i_r=R_r$ as in the previous example.

FIG. 7b shows the active burden 29 in the variant of FIG. 7a, connected directly to the secondary winding of the transformer 25 with an additional current transformer 24 used to extract the $i_p$ signal.

Figure 8:
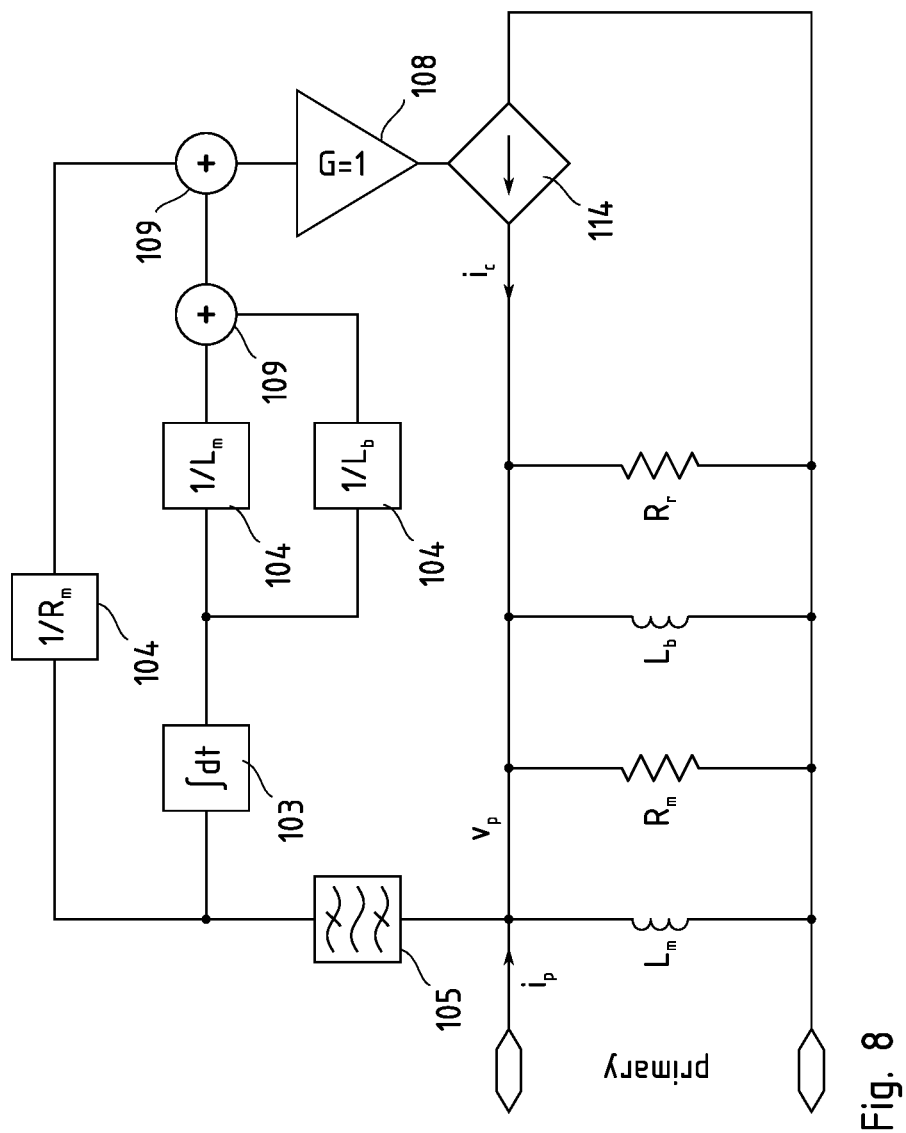
FIG. 8 shows an open-loop voltage-controlled, current source embodiment.

Open-Loop Voltage-Controlled Current Source Embodiment (FIG. 8)

FIG. 8 illustrates another possible structure for the circuit of the invention, based on a voltage-controlled current source 114 driven by the input voltage $v_p$ through a band-pass filter 105 and a network comprising an integrator 103 whose output is weighted by $(1/L_m+1/L_b)$ and a proportional branch with weight $1/R_m$, such that, in the band of frequencies selected by the filter 105, the correction current is given by $i_c=v_p/R_m+(1/L_m+1/L_b) \cdot \int v_p dt$ so that $i_p=v_p/R_r$. Then $Z_p=v_p/i_r=R_r$. Note that, since the output current $i_c$ does not directly influence the sensed voltage $v_p$, this is an open-loop control.

The active burden circuit of FIG. 8 can be connected at the secondary terminals of the transformer, as in FIG. 6b.

Figure 11:
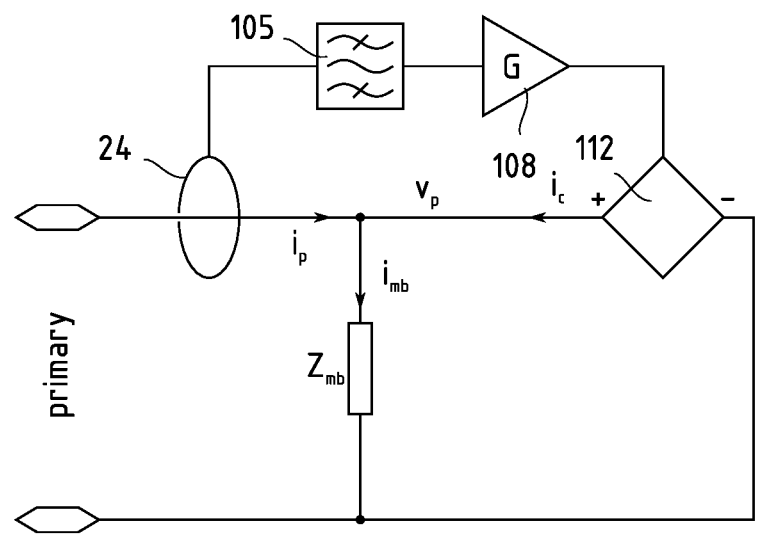
FIG. 11 shows a closed-loop voltage-controlled embodiment.

Closed-Loop Voltage-Controlled Embodiment (FIG. 11)

Another possible example of realization includes, as represented, a controlled voltage source 112 of output $v_p$ that is driven by an amplifier 108 whose input is connected to current sensor 24, which may be an auxiliary current transformer as in the embodiment of FIGS. 7a/7b. The filter 105 limits the action of the compensation circuit to the signalling band. The transfer function creating the driven voltage $v_p$ from sensed current $i_p$ is the forward transimpedance $Z_x$. Impedance $Z_x$ is the same as the impedance measured on the primary. Amplifier 108 with voltage source 112 is arranged to cancel current $i_p$ flowing in the burden network, such that the impedance of the burden network in the desired band of frequency is increased.

$v_p$ Primary voltage
$i_p$ Primary current
$Z_{mb}$ Magnetizing and burden equivalent impedance
$i_{mb}$ Magnetizing and burden equivalent current
$i_c$ Compensation current
$Z_x$ Forward transimpedance The forward transimpedance is $$Z_x = \frac{v_p}{i_p}$$

Currents are given by $$i_{mb} = i_p + i_c$$

$$i_{mb} = \frac{v_p}{Z_{mb}}$$

So, the current drawn from voltage source 112 is $$i_c = v_p \cdot \left( \frac{1}{Z_{mb}} - \frac{1}{Z_c} \right)$$

The resultant impedance measured on the primary is $Z_x$

Figure 10:
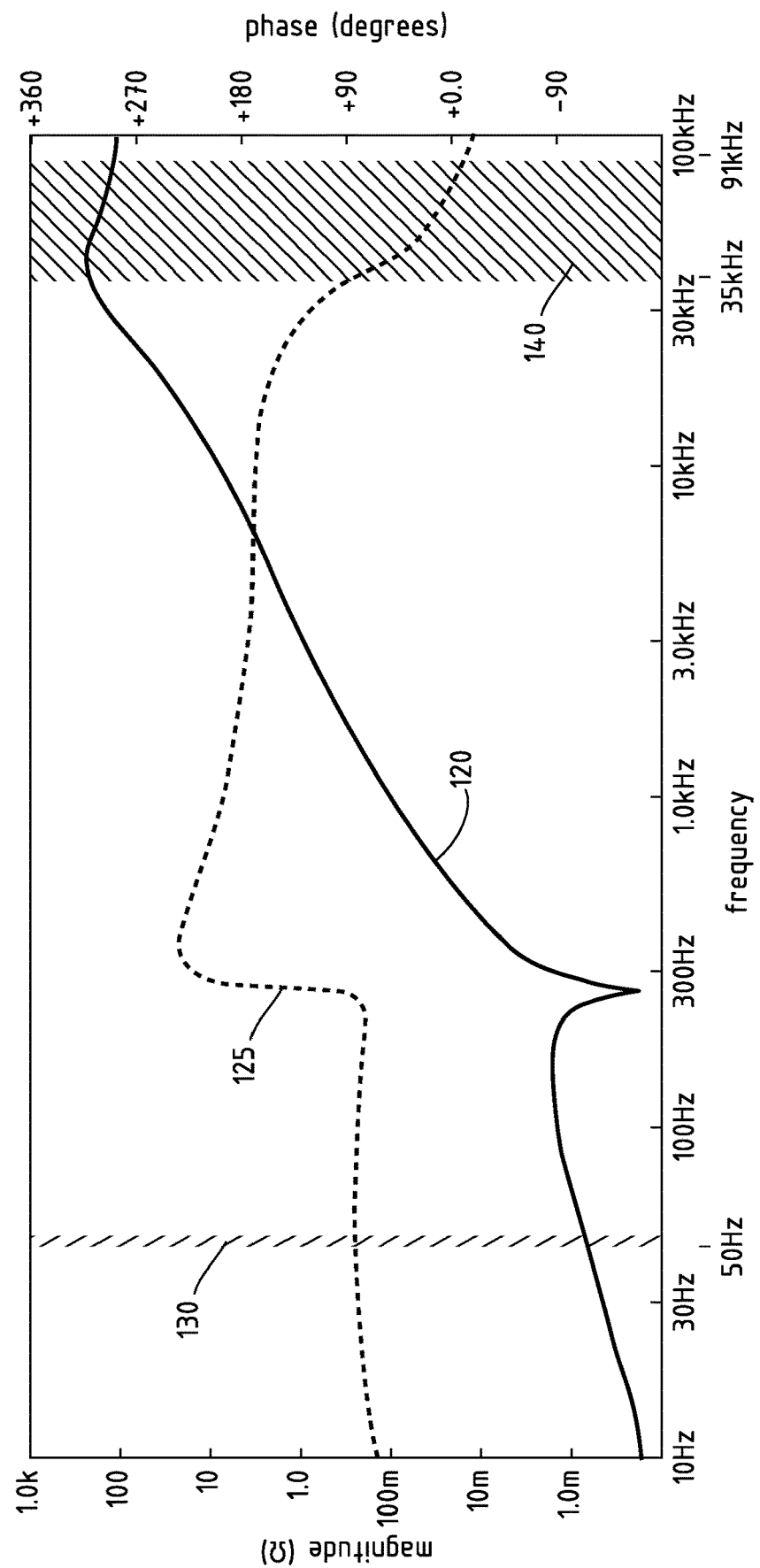
FIG. 10 is a plot of the resulting impedance in the power and signalling bands of a smart meter.

FIG. 10 is a Bode plot showing the action of the inventive decoupling impedance, in the embodiment of FIG. 9. The circuit has been optimized for signalling in the CENELEC A band. The bands of frequency of the power distribution and that used by the plc signalling are indicated by the hashed areas 130 and, respectively 140. It can be appreciated that the magnitude of the primary impedance 120 is very low at 50-60 Hz, which leads to low losses and increases the maximum current that can be circulated without saturating the core and rises to approximately 100Ω n the signalling band. As shown by the phase plot 125, the impedance in the signalling band is essentially resistive in nature.

REFERENCE NUMBERS USED IN THE FIGURES 20 active decoupling impedance, active impedance stabilizer
24 sense transformer
25 transformer
28 auxiliary power supply
29 active burden network
30 customer
32 load
35 power line
40 victim device/smart meter
42 kWh meter
45 PLC modem
47 Data Concentrator
60 server
103 integrator
104 attenuation
105 filter
108 amplifier
112 controlled voltage source
114 controlled current source
120 magnitude
125 phase
130 power frequency band
140 target band of frequency, signalling band

The invention claimed is:

1. An active decoupling impedance comprising a transformer having a primary winding connectable on an electrical power line between a victim device and an electrical load, and a burden network, connected to a secondary winding of the transformer, wherein the burden network is arranged to generate a first impedance on the powerline at a power frequency, and a second impedance with an absolute value larger than that of the first impedance in a predetermined band of frequency above the power frequency.

2. The active decoupling impedance of claim 1, wherein the transformer is a current transformer.

3. The active decoupling impedance of claim 2, wherein the predetermined band is comprised in any of the following intervals: 35 kHz to 91 kHz; 98 kHz to 122 kHz; 155 kHz to 403 kHz; 155 kHz to 487 kHz.

4. The active decoupling impedance of claim 1, having an absolute value of the impedance seen on the power line in the predetermined band of at least 5 Ohm.

5. The active decoupling impedance of claim 1, having an absolute value of the impedance seen on the power line in the predetermined band of at least 10 Ohm.

6. The active decoupling impedance of claim 1, comprising a filter selecting the components of the line voltage in the predetermined band of frequency, an amplifier having an input connected to an output of the filter, the amplifier being arranged to cancel a current flowing in the burden network in the predetermined band, such that the impedance of the burden network in the predetermined band of frequency is increased.

7. The active decoupling impedance of claim 1 in combination with an electrical meter connectable on the electrical power line between an energy provider and one or several electrical loads for measuring use of electrical energy by the one or several electrical loads, wherein the electrical meter has a PLC interface for transmitting and/or receiving data through the power line in the predetermined band of frequency, the line impedance stabilizer being connected between the electrical meter and the one or several electrical loads.

* * * * *